United States Patent
Jathar (10) Patent No.: US 10,698,768 B2
(45) Date of Patent: Jun. 30, 2020

(54) SYSTEMS AND METHODS FOR VIRTUAL MACHINE FILE EXCLUSION

(71) Applicant: Druva, Inc., Sunnyvale, CA (US)

(72) Inventor: Sudeep Jathar, Pune (IN)

(73) Assignee: Druva, Inc., Sunnyvale, CA (US)

( * ) Notice: Subject to any disclaimer, the term of this patent is extended or adjusted under 35 U.S.C. 154(b) by 401 days.

(21) Appl. No.: 15/599,117

(22) Filed: May 18, 2017

(65) Prior Publication Data

US 2018/0129569 A1 May 10, 2018

(30) Foreign Application Priority Data

Nov. 8, 2016 (IN) .............................. 201611038157

(51) Int. Cl.
*G06F 16/30* (2019.01)
*G06F 11/14* (2006.01)
*G06F 16/14* (2019.01)

(52) U.S. Cl.
CPC ........ *G06F 11/1451* (2013.01); *G06F 16/148* (2019.01); *G06F 2201/815* (2013.01); *G06F 2201/84* (2013.01)

(58) Field of Classification Search
CPC ... G06F 11/1469; G06F 16/148; G06F 16/188
USPC ....... 707/607, 609, 687, 705, 769, 790, 813, 707/821
See application file for complete search history.

(56) References Cited

U.S. PATENT DOCUMENTS

| | | | | |
|---|---|---|---|---|
| 10,061,653 | B1 * | 8/2018 | Mam | G06F 16/188 |
| 10,114,705 | B1 * | 10/2018 | Kumar | G06F 11/1469 |
| 2006/0026383 | A1 * | 2/2006 | Dinechin | G06F 12/1036 711/207 |
| 2008/0177994 | A1 * | 7/2008 | Mayer | G06F 9/4418 713/2 |
| 2009/0313503 | A1 * | 12/2009 | Atluri | G06F 11/1453 714/19 |
| 2014/0006858 | A1 * | 1/2014 | Helfman | G06F 11/1448 714/19 |

OTHER PUBLICATIONS

Veeam Help Center, "Veeam Backup & Replication 9.0 User Guide for VMware vSphere," [Online][Retrieved Oct. 2, 2019], Updated Aug. 11, 2016, Retrieved from URL:<<https://helpcenter.veeam.com/archive/backup/90/vsphere/guest_file_exclusion.html>>.

* cited by examiner

*Primary Examiner* — Sana A Al-Hashemi
(74) *Attorney, Agent, or Firm* — Fenwick & West LLP (57) ABSTRACT

The present invention relates generally to backups and more specifically to virtual machine (VM) backups including file exclusion. Aspects of the present invention related to using a specialized buffer to identify a file for exclusion. In embodiments, a file system used by the VM can be used to search for the specialized buffer. In embodiments, when the specialized buffer is located, offsets are noted related to the file associated with the specialized buffer. In embodiments, the offsets are used to zero out blocks associated with the offsets. Thus, the file can be effectively excluded from the backup.

20 Claims, 6 Drawing Sheets

SYSTEMS AND METHODS FOR VIRTUAL MACHINE FILE EXCLUSION

CROSS-REFERENCE TO RELATED APPLICATION

This patent application claims the priority benefit of co-pending and commonly-owned Indian Provisional Application 201611038157, filed on Nov. 8, 2016, entitled "Systems and Methods for Virtual Machine File Exclusion," and listing Sudeep Jathar as inventor, which patent document is incorporated by reference herein in its entirety and for all purposes.

BACKGROUND

A. Technical Field

The present invention relates generally to storage backups and more particularly to a virtual machine storage backup excluding certain files.

B. Description of the Related Art

As the value and use of information continues to increase, individuals and businesses seek additional ways to process and store information. One option available to users is the use of virtual machines (VM). A VM is a software representation of a physical computer system.

One important feature in VMs is the ability to backup information stored on VMs. However, there are circumstances where not all the information needs to be backed up. For example, there are databases that contain the data as well as administrative files, such as logs, an installer, etc. Backing up data has a certain cost associated with it and the greater the volume of backed up data, the greater the cost. Therefore, it is advantageous to backup only the necessary data and not additional files.

Image level backups, as is often done to backup VMs, do not support file by file backup or file exclusion from the backup. Prior art backup systems require a custom code with knowledge of a particular file system to identify specific files to exclude. VMs can be created with a variety of file systems, like New Technology File System (NTFS), Extended File System (EXT) versions 2/3/4, Extents File System (XFS), and many others.

The prior art solution requires a particular code that is written for each file system and needs to traverse the file system on-disk data structures directly. This traversal means that the backup program needs to incorporate file system specific code. The need to have file system specific code limits the number of supported file systems and increases development and testing time.

Also, prior art systems are limited because the prior art system require deep knowledge of each of file systems supported. One of the prior art systems is limited to a particular file to exclude, pagefile.sys because it parses Master File Table (MFT) into NTFS.

Prior art backup systems and methods get a copy of an image and back up as a row of bytes However, it is not feasible to perform file level exclusion. The prior art systems involve having a custom program designed to operate knowledge of a particular file system to identify and exclude a file to exclude from a backup.

Furthermore, there is additional complication is handling logical volumes, in prior art systems.

Accordingly, what is needed is systems and methods to perform file level exclusion from backups that can operate with a variety of file systems without having deep knowledge of the particular file system.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that: (1) certain steps may optionally be performed; (2) steps may not be limited to the specific order set forth herein; (3) certain steps may be performed in different orders; and (4) certain steps may be done concurrently.

The present invention relates in various embodiments to devices, systems, methods, and instructions stored on one or more non-transitory computer-readable media involving file exclusion in VM backup. Such devices, systems, methods, and instructions stored on one or more non-transitory computer-readable media can result in, among other advantages, in virtual machine (VM) file exclusion.

Figure 1:
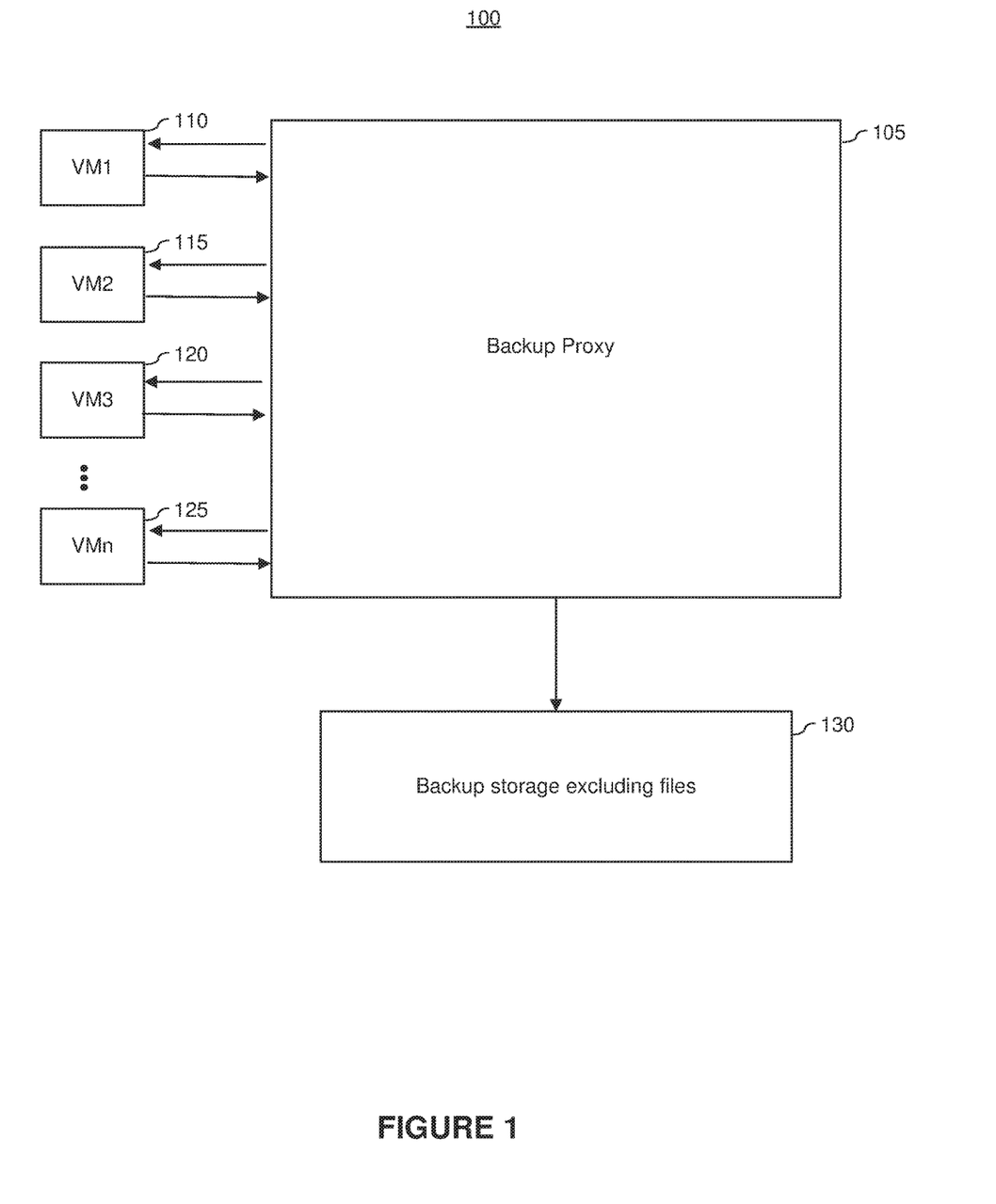
FIG. 1 depicts a high-level block diagram of a virtual machine (VM) file backup according to embodiments in this patent document.

FIG. 1 depicts a high-level block diagram of a virtual machine (VM) file backup according to embodiments in this patent document. A VM backup can be performed frequently to preserve data stored on a VM. Often it is desirable to backup some, but not all, files on a VM. For example, frequently it is desirable to backup data files on a VM. However, there are other administrative files on the VM as well such as log files, files that store the state of the VM, configuration files, etc. There is considerable cost in storing data in terms of money, time of running a backup, bandwidth used when running the backup, disk space used to store the backup. Therefore, it is desirable to backup only the data stored on the VM and not the administrative files. However, in the prior art systems, there is no file system agnostic way to exclude particular files from a VM backup.

The prior art systems require a user to design a custom code with specific knowledge of the file system used to exclude a particular file from a backup. These types of programs are limited in utility since they do not operate across file system platforms.

The system shown in the block diagram 100 in FIG. 1 is a file exclusion system that operates across file systems. FIG. 1 shows a backup proxy 105. In embodiments, the backup proxy 105 is itself a VM. In embodiments, the backup proxy is communicatively coupled to a plurality of VMs 110, 115, 120, and 125. VMs 110, 115, 120, and 125 can be VMs for which a backup is desired.

In embodiments, VMs 110, 115, 120, and 125 can be any type of system for which a backup is desired. For example, VMs 110, 115, 120, and 125 can be VMs, files, remote storage, cloud storage, local storage, or any other storage where a backup is desired. Furthermore, the embodiments described in this patent document can apply across hypervisor platforms. A hypervisor can be software, hardware, or firmware that creates and controls a VM.

The backup proxy 105 creates a backup that excludes certain identified files 130. In embodiments, the backup stored in backup storage 130 contains only the files that are not excluded. Backup storage excluding files 130 is a storage that stores the backup excluding identified files. Backup storage 130 can be any storage system, VM, remote storage, cloud storage, local storage, memory, hard disk drive, solid state drive, or any other storage. Additional detail regarding the backup proxy 105 and backup storage 130 will be described below in relation to FIGS. 2 and 3.

Figure 2:
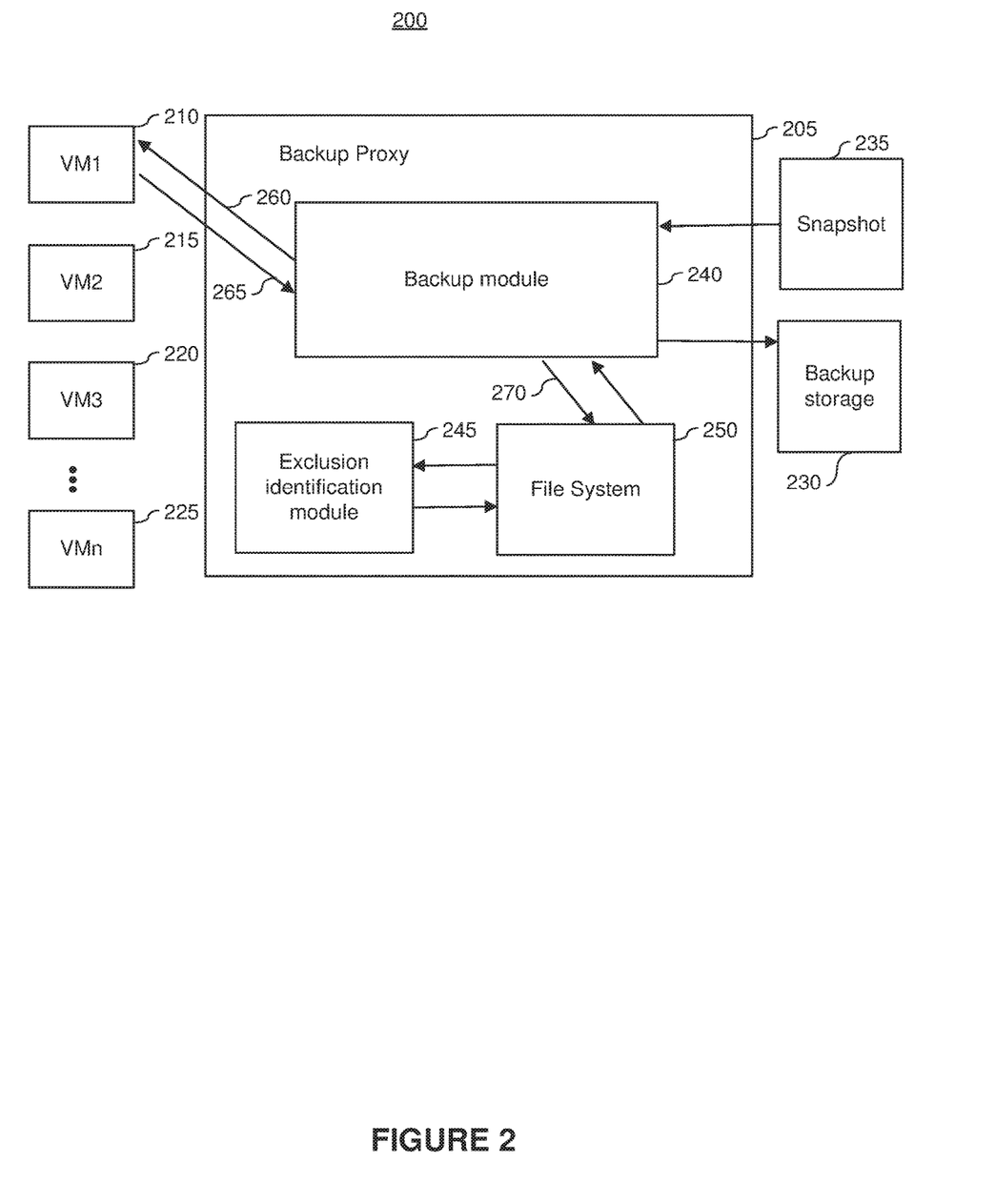
FIG. 2 depicts a block diagram of a virtual machine (VM) file backup according to embodiments in this patent document.

FIG. 2 depicts a block diagram of a virtual machine (VM) file backup according to embodiments in this patent document. FIG. 2 provides further detail of the backup proxy 205 and the backup system 200.

Backup proxy 205 further comprises a backup module 240, exclusion identification module 245, and file system 250. In embodiments, backup module 240 is the module running on VM backup proxy 205 responsible for creating the backup and sending it to backup storage 230. Similar to backup storage 130, backup storage 230 can be any storage system, VM, remote storage, cloud storage, local storage, memory, hard disk drive, solid state drive, or any other storage. In embodiments, VM backup proxy 205 has a virtual central processing unit (vCPU) that is comprised of a physical central processing unit (CPU) assigned to the VM. Backup proxy 205 VM also has a memory associated with it. In other embodiments, backup proxy 205 can be implemented on another specialized computer having a processor, a processor and a data storage component.

In embodiments, when a backup process is started, the backup module 240 sends a request to a VM 260, for example, VM1 210, for a snapshot of the disks of VM1. A snapshot is also referred to as an image and captures all the data on the disks of the VM exactly as it is at that moment in time.

Responsive to receiving a snapshot request from backup module 240, VM1 210 prepares a snapshot and sends a snapshot ready notification 265 to the backup module 240 when the snapshot is ready. In embodiments, snapshot 235 is communicatively coupled to backup proxy 205 in read only mode.

File system 250 can be any file system capable of interrupting an input/output (I/O) call on a mounted image. A file system is the methods and data structures used to keep track of and files on a disk. A file system is typically used by an operating system as a way of organizing files within the storage space or memory used by an operating system. Mounting refers to the way a file system is accessed. A file system is accessed by way of mounting it in order to make the storage space and file infrastructure available to be viewed.

In embodiments, the image or snapshot 235 contains file system 250. Backup proxy 205 creates and mounts a file system. One example of a file system that backup proxy 205 creates and mounts is the File System in User Space (FUSE) file system in Linux, a Unix-like operating system. Other examples of file systems include, but are not limited to New Technology File System (NTFS), Extended File System (EXT) versions 2/3/4, and Extents File System (XFS).

In embodiments, backup module 240 is communicatively coupled to file system 250. In embodiments, backup module 240 communicates with file system 250 to request the data from the backup module 240. Backup module 240 responds to file system 250 requests for data. Backup module 240 responds by sending data from the snapshot 235 to the file system 250 by communication 270. In embodiments, the data requested and sent are from the snapshot 235. In other embodiments, the data requested and sent are not from the snapshot 235. For example, the data can be from any image source such as a file, a remote storage, a cloud storage, a local storage, or any other data.

In embodiments, once a user has identified a particular file(s) for exclusion, the exclusion identification module 245 inserts specialized buffer associated with those file(s) to be excluded. In embodiments, the specialized buffer includes a special header and the file name. In other embodiments, the specialized buffer includes the special header and an association with the file.

During a backup, the backup module 240 sends data from the snapshot 235, or from another source, to the file system 250. Backup module also writes the data from the snapshot 235 or other location, to the backup storage 230.

In embodiments, during a backup, file system 250 also searches for the specialized buffer. If file system 250 locates the specialized buffer, file system 250 notes offsets of the file at a block level. File system 250 sends those offsets to backup module 240. Backup module 240 uses the offsets to zero out the offset locations before uploading the backup to the backup storage 230.

The following example where VM1 210 has two disks to backup and use a FUSE file system is described below. The example, including the file system, disks, commands used, etc. is provided by way of example only and is not intended to be limiting in any way. VM1 210 can have two disks for backup, disk 1 and disk 2. The FUSE file system can be mounted to expose the list of disk images. For example using the command:

is −1/home/images
    disk1.vmdk disk2.vmdk For the purposes of this example, disk1.vmdk and disk2.vmdk are raw disks of VM1 210. Those disks can be communicatively coupled to backup proxy 205 in a read only mode.

For purposes of this example, disk1 and disk2 can be mounted using a loop device with full read/write access. For example using the following commands:

losetup/dev/loop1/home/images/disk1.vmdk
    losetup/dev/loop2/home/images/disk2.vmdk
    mount −t ntfs/dev/loop1/mnt/disk1
    mount −t ntfs/dev/loop2/mnt/disk2

For the purpose of this example, the file systems on disk1 and disk2 are mounted at /mnt/disk. Also, any read/write requests on the mounted file system will be routed to the FUSE layer.

For the purpose of this example, the only writes issued after mounting are by the file system driver, for example, for recovery purposes to remove orphaned inodes. For this example, the mounted disks will not be changed. The write is implemented as a copy-on-write.

For the purpose of this example, a user has selected the file/mnt/disk1/log/test.log to be excluded from the backup. The exclusion identification module 245 is used to inject the buffer with a special buffer including a header and an identification of the file name of the file to be excluded. For example, the special buffer can be injected as follows:

File_size=os.stat('/mnt/disk1/log/test.log').st_size
    Header=druva: <file path>"
    Buffer=header+(4096−len(header))*chr(0)
    With open('/mnt/disk1/log/test.log', 'r+' as f:
    #Signal to fuse
    For offset in range (0, file_size, 4096):
    f.write(buffer)

For the purpose of this example, the FUSE layer intercepts the write calls, for example using the following:

#path here is /home/images/disk1.vmdk and not /mnt/disk1/log/test.log if buf.startswith('druva:'):
    #Write the 'offset' to a file
    else:
    #Write to write cache on a copy-on-write basis In this example, as in the embodiments described above, if the header matches, there is no actual I/O happening other than noting the offsets. For the purpose of this example, "startswith" was used. However, the special buffer does not have to be at the start of the "buf." It can be at any location. The "startswith" is merely an example.

Figure 3:
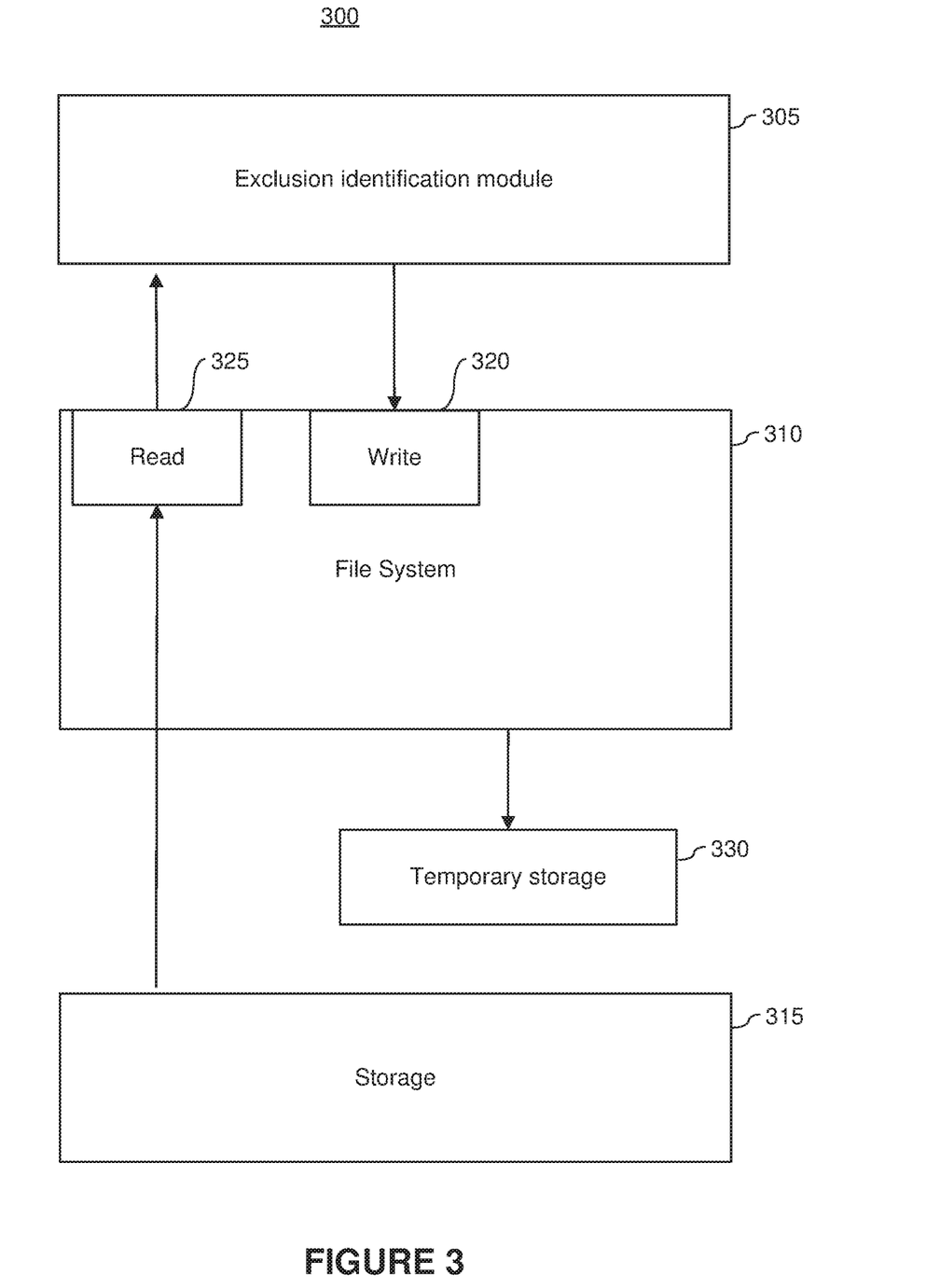
FIG. 3 depicts a block diagram of a virtual machine (VM) file backup during a backup, after mounting occurs, according to embodiments in this patent document.

FIG. 3 depicts a block diagram of a virtual machine (VM) file backup during a backup, after mounting occurs, according to embodiments in this patent document. FIG. 3 shows system 300 including exclusion identification module 305, file system 310, and data storage 315.

Data storage 315 is used for storing an image source. An image source can be a file, remote storage, device attached to a VM, or any other image source. In embodiments, data storage 315 sends the image source to file system 310. File system 310 has the capability to perform a read operation 325 and to perform a write operation 320. In embodiments, file system 310 reads 325 image source and sends image source to exclusion identification module 305.

On a write operation, exclusion identification module sends data to the write operation 320 in files system 310.

File system 310 is a file system that can be any file system that supports mounting. File system 310 searches for a specialized buffer. Once a specialized buffer is found, file system 310 notes the offsets. File system 310 intercepts the write operation 320 to check for specialized header information. When there is no specialized buffer, the file system writes to a temporary storage 330. Temporary storage 330 can be any type of temporary storage, including but not limited to a memory cache, a hard drive, null storage, and a key-value data store. In some embodiments, a permanent storage can be used as temporary storage 330. Permanent storage can be any type of storage, including but not limited to hard drive and key-value data store. When there is specialized buffer, the file system notes the offsets at a block level of the file included in the specialized buffer.

In embodiments, the specialized buffer includes a special header and the file name. In other embodiments, the specialized buffer includes the special header and an association with the file.

Figure 4:
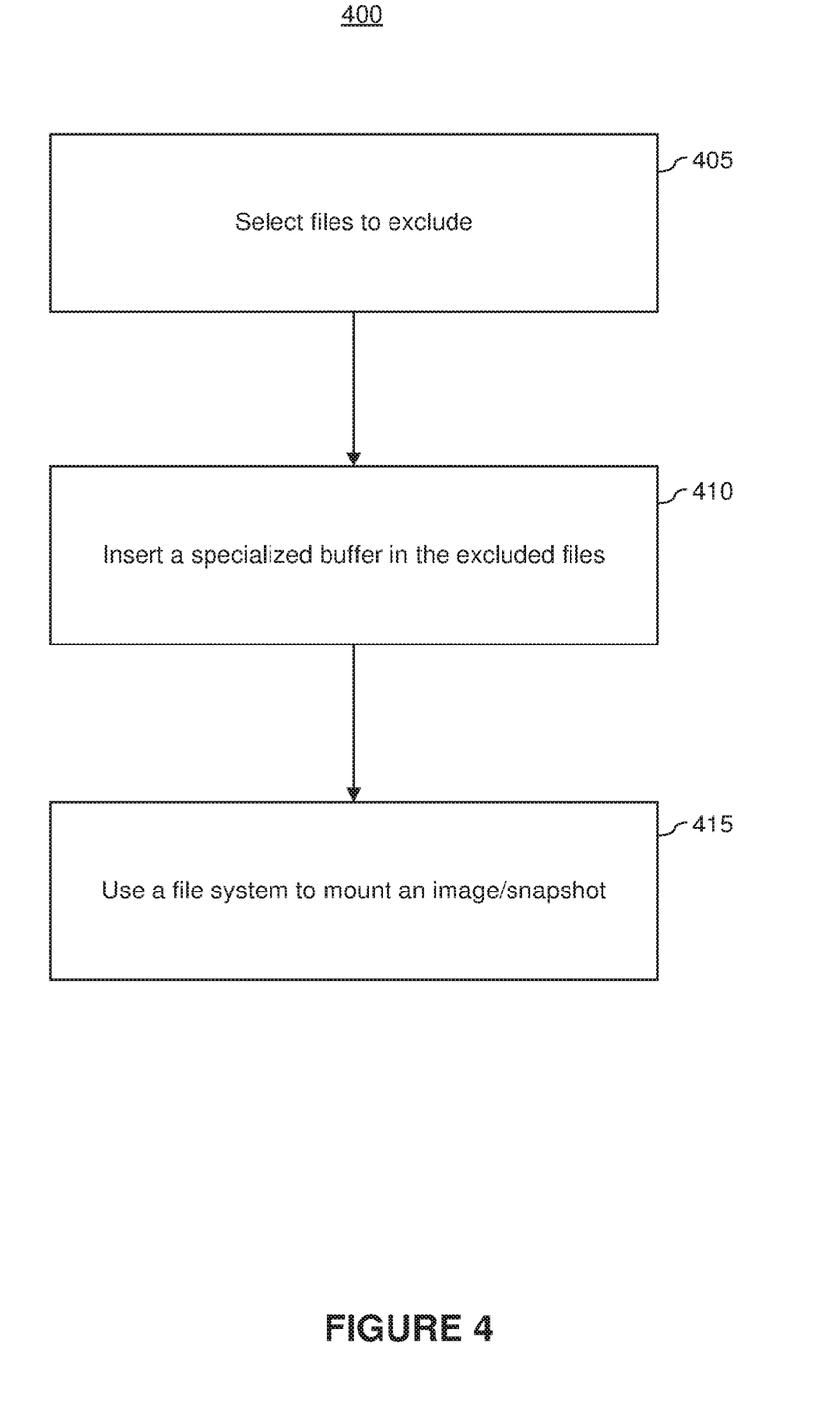
FIG. 4 depicts a flow chart of a virtual machine (VM) file exclusion, prior to backup, according to embodiments in this patent document.

FIG. 4 depicts a flow chart of a virtual machine (VM) file exclusion, prior to backup, according to embodiments in this patent document. FIG. 4 shows method 400 of VM file exclusion backup. A user can select files to exclude from the backup 405. A specialized buffer is inserted in the excluded files 410. In embodiments, the specialized buffer includes a special header and the file name. In other embodiments, the specialized buffer includes the special header and an association with the file.

The file system is used to mount an image 415. In embodiments, the image is a file, remote storage, device attached to a VM, or any other image. Once the image has been mounted, the file system can be accessed at a file level and a search for the specialized buffer can be performed.

Figure 5:
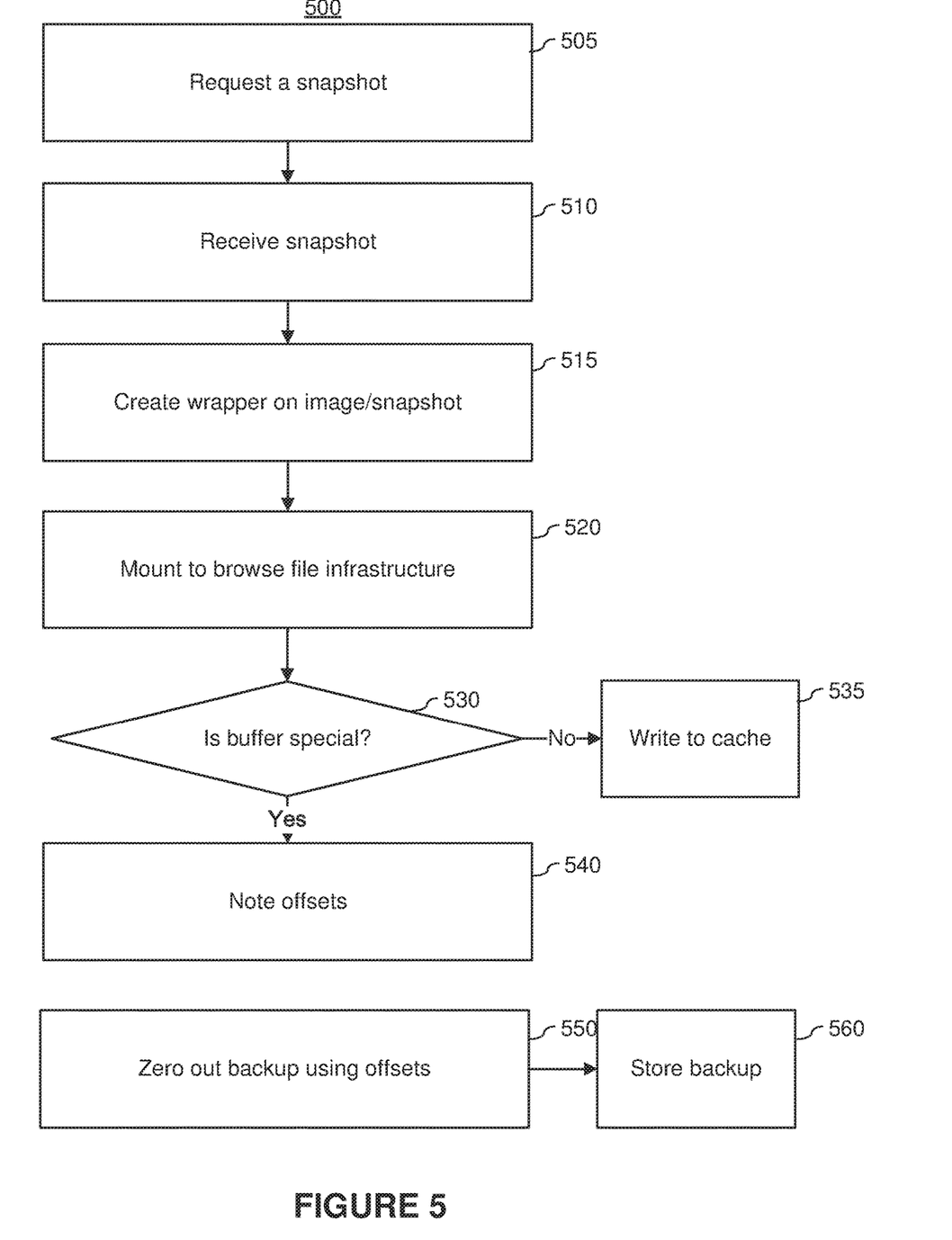
FIG. 5 depicts a flow chart of a virtual machine (VM) file exclusion backup during a backup process according to embodiments in this patent document.

FIG. 5 depicts a flow chart of a virtual machine (VM) file exclusion backup during a backup process according to embodiments in this patent document. FIG. 5 shows process 500 for performing a backup according to embodiments in this patent document. In embodiments, to initiate a backup, a snapshot is requested 505. A snapshot is received 510. A wrapper is created on the snapshot or image 515. In embodiments, the wrapper refers to the FUSE file system. This FUSE filesystem presents the virtual machine disks (VMDKs) as files.

The image is mounted to browse the file infrastructure 520 in the file system. Mounting the image permits access to the file infrastructure to locate any specialized buffer. The process checks to see if there is a special buffer 530. If not, write to the cache as per a typical backup 535. If there is a special buffer 530, then note the offsets associated with the special buffer 540. Before the backup is written to any backup storage, the offsets are used to zero out blocks associated with the offsets 550. The backup, including the zeroed out blocks, or excluding the files selected, is written to a backup storage 560.

Figure 6:
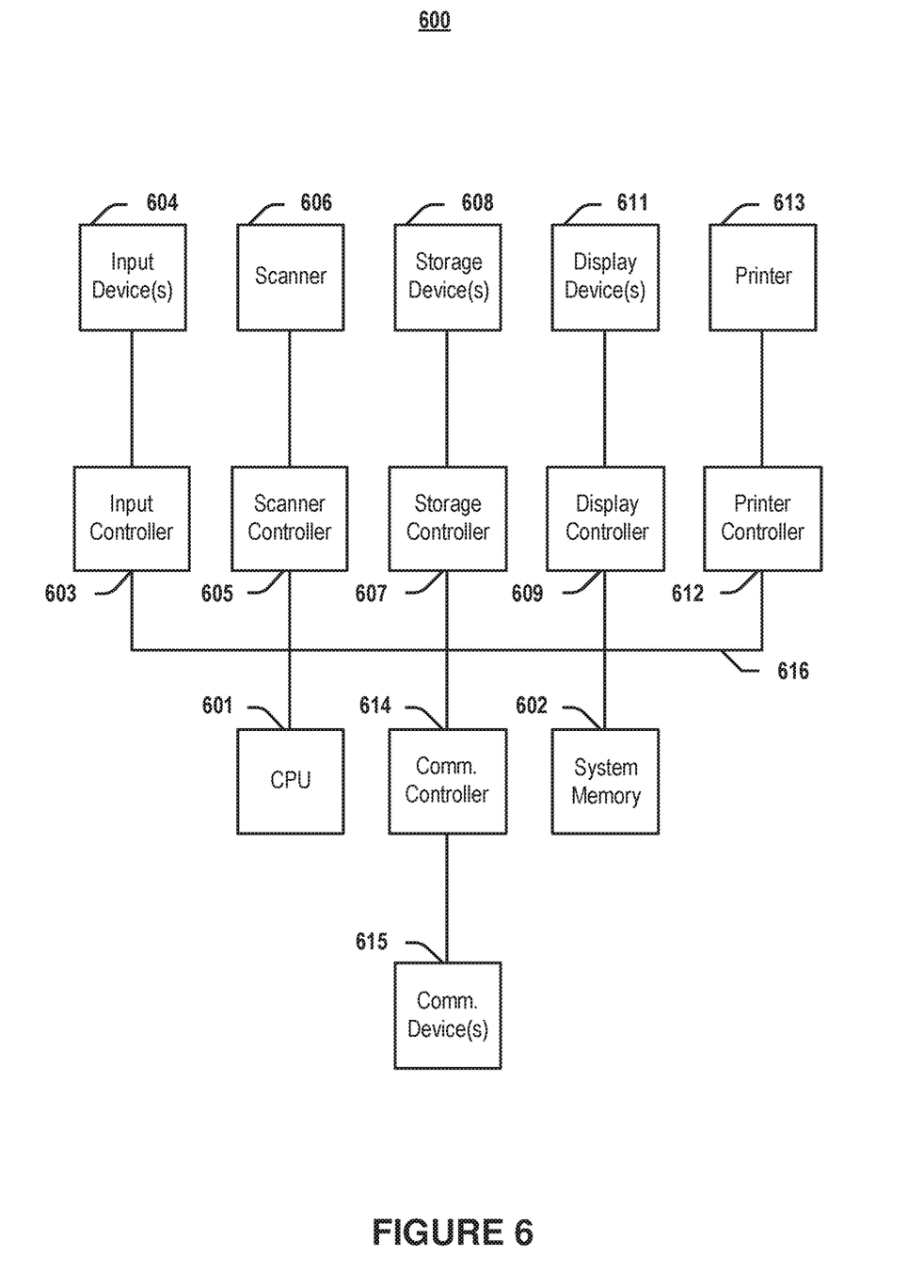
FIG. 6 depicts a block diagram of a computer system 600, including a VM system, according to embodiments of the present invention.

FIG. 6 depicts a block diagram of a computer system 600, including a VM system, according to embodiments of the present invention. It will be understood that the functionalities shown for system 600 may operate to support various embodiments of an information handling system—although it shall be understood that an information handling system may be differently configured and include different components. As illustrated in FIG. 6, system 600 includes a central processing unit (CPU) 601 that provides computing resources and controls the computer. CPU 601 may be implemented with a microprocessor or the like, and may also include a graphics processor and/or a floating point coprocessor for mathematical computations. System 600 may also include a system memory 602, which may be in the form of random-access memory (RAM) and read-only memory (ROM).

A number of controllers and peripheral devices may also be provided, as shown in FIG. 6. An input controller 603 represents an interface to various input device(s) 604, such as a keyboard, mouse, or stylus. There may also be a scanner controller 605, which communicates with a scanner 606. System 600 may also include a storage controller 607 for interfacing with one or more storage devices 608 each of which includes a storage medium such as magnetic tape or disk, or an optical medium that might be used to record programs of instructions for operating systems, utilities and applications which may include embodiments of programs that implement various aspects of the present invention. Storage device(s) 608 may also be used to store processed data or data to be processed in accordance with the invention. System 600 may also include a display controller 609 for providing an interface to a display device 611, which may be a cathode ray tube (CRT), a thin film transistor (TFT) display, or other type of display. The computing system 600 may also include a printer controller 612 for communicating with a printer 613. A communications controller 614 may interface with one or more communication devices 615, which enables system 600 to connect to remote devices through any of a variety of networks including the Internet, an Ethernet cloud, an FCoE/DCB cloud, a local area network (LAN), a wide area network (WAN), a storage area network (SAN) or through any suitable electromagnetic carrier signals including infrared signals.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Advantages of the embodiments described in this patent document include that no specialized knowledge of the file system data structures is required.

Another advantage is that the embodiments described in this patent document can handle logical volumes.

A further advantage is that the file systems own driver is used to parse file system data structures. Thereby reducing testing time and improving accuracy.

Yet another advantage is that support for an additional file system is as simple as installing the driver for the file system.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the examples and embodiments herein are exemplary and not limiting to the scope of the present invention. It is intended that all permutations, enhancements, equivalents, combinations, and improvements thereto that are apparent to those skilled in the art upon a reading of the current document are included within the true spirit and scope of the present invention.

What is claimed is:

1. A method for file exclusion in a virtual machine (VM) backup, the method comprising:
   receiving an image of a disk of the virtual machine;
   mounting the image to browse a file infrastructure and intercept write calls for writing data from the image to a backup storage of the virtual machine;
   intercepting the write calls and inspecting files associated with the write calls for writing data to the backup storage, inspecting the files comprising locating a specialized buffer associated with a particular file, the specialized buffer comprising a header associated with the particular file and inserted into the particular file based on a user selection;
   responsive to locating the header, noting offsets for the particular file; and
   writing, while excluding the particular file in accordance with the offsets, the data of the image to the backup storage.

2. The method of claim 1 wherein the method can be used with a variety of file systems.

3. The method of claim 1 wherein the specialized buffer further comprises a filename associated with the header.

4. The method of claim 1 wherein inspecting the specialized buffer associated with the particular file uses a file system driver to perform the inspection.

5. The method of claim 1 wherein excluding the particular file in accordance with the offsets comprises using the offsets to zero out a block associated with the offsets associated with the particular file in the backup.

6. The method of claim 1 further comprising injecting the specialized buffer into the particular file identified for exclusion.

7. The method of claim 1 further comprising writing a file to the backup storage responsive to not locating the specialized buffer.

8. A system for file exclusion in a virtual machine (VM) backup, the system comprising:
   a specialized buffer associated with a particular file to be excluded, the specialized buffer inserted into the particular file based on a user selection;
   a file system executing on a processor, the file system configured to mount an image of a disk of the VM to browse a file infrastructure, configured to copy the image by performing a series of write calls to write the image to a backup storage, configured to inspect files associated with the write calls for writing data to the backup storage by locating the specialized buffer associated with the particular file to be excluded, the specialized buffer comprising a header associated with the particular file, and configured to, responsive to locating the header, noting offsets associated with the particular file to be excluded; and
   a backup system configured to backup up the VM by writing the image of the VM to backup storage while excluding the particular file in accordance with the offsets.

9. The system of claim 8 wherein the file system can be one of a variety of file systems.

10. The system of claim 8 wherein the specialized buffer further comprises a filename associated with the header.

11. The system of claim 8 further comprising the backup storage configured to store the image of the VM.

12. The system of claim 11 wherein excluding the particular file in accordance with the offsets comprises zeroing out a block associated with the offsets associated with the particular file to be excluded.

13. A non-transitory computer readable medium for storing computing code comprising instructions, the instructions, when executed by one or more processors, cause the one or more processors to perform steps for file exclusion in a virtual machine (VM) backup, the steps comprising:
   requesting an image of a disk of the virtual machine;
   receiving the image of the disk of the virtual machine;
   mounting the image to browse a file infrastructure and intercept write calls for writing data from the image to a backup storage of the virtual machine;
   intercepting the write calls and inspecting files associated with the write calls for writing data to the backup storage, inspecting the files comprising locating a specialized buffer associated with a particular file, the specialized buffer comprising a header associated with the particular file and inserted into the particular file based on a user selection;
   responsive to locating the header, noting offsets for the particular file; and
   writing, while excluding the particular file in accordance with the offsets, the data of the image to the backup storage.

14. The non-transitory computer readable medium of claim 13 wherein the VM can be used with a variety of file systems.

15. The non-transitory computer readable medium of claim 13 wherein the specialized buffer further comprises a filename associated with the header.

16. The non-transitory computer readable medium of claim 13 wherein the instructions for inspecting the specialized buffer associated with the particular file causes the one or more processors to use a file system driver to perform the inspection.

17. The non-transitory computer readable medium of claim 13, wherein the instructions, when executed by the one or more processors, further causes the one or more processors to inject the specialized buffer into the particular file identified for exclusion.

18. The non-transitory computer readable medium of claim 13 wherein the VM is used to handle logical volumes.

19. The non-transitory computer readable medium of claim 13 wherein the instructions to exclude the particular file in accordance with the offsets comprises instructions that cause the one or more processor to zero out a block associated with the offsets associated with the particular file in the backup.

20. The non-transitory computer readable medium of claim 13 wherein the backup storage is cloud storage.

\* \* \* \* \*